United States Patent
Soergel et al.

(10) Patent No.: US 6,529,780 B1
(45) Date of Patent: Mar. 4, 2003

(54) METHOD FOR AUTOMATIC OPERATION OF INDUSTRIAL PLANTS

(75) Inventors: Guenter Soergel, Nuremberg (DE);
Otto Gramckow, Uttenreuth (DE);
Thomas Heimke, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/403,114

(22) PCT Filed: Apr. 2, 1998

(86) PCT No.: PCT/DE98/00935

§ 371 (c)(1),
(2), (4) Date: Jan. 11, 2000

(87) PCT Pub. No.: WO98/47052

PCT Pub. Date: Oct. 22, 1998

(30) Foreign Application Priority Data

Apr. 14, 1997 (DE) .......................... 197 15 503

(51) Int. Cl.[7] .................. G05B 15/02; G05B 11/01; G05B 13/02; G06F 19/00; G06F 11/00; G06F 15/16

(52) U.S. Cl. .............. 700/10; 700/9; 700/29; 700/104; 700/108; 700/19; 702/188; 709/217

(58) Field of Search ............... 700/28–31, 47–49, 700/96–97, 104, 108, 109, 148–156, 9, 10, 19; 706/903–904, 906, 912, 914; 702/188; 709/100, 201, 217, 218

(56) References Cited

U.S. PATENT DOCUMENTS

| | | | |
|---|---|---|---|
| 4,152,760 A | * | 5/1979 | Freitas et al. ............... 700/9 |
| 4,783,998 A | | 11/1988 | Sander |
| 4,807,108 A | | 2/1989 | Ben-Arieh et al. |
| 4,975,865 A | * | 12/1990 | Carrette et al. ............. 700/10 |
| 5,418,710 A | | 5/1995 | Ono et al. |
| 5,513,097 A | | 4/1996 | Gramckow et al. |

(List continued on next page.)

FOREIGN PATENT DOCUMENTS

| | | |
|---|---|---|
| DE | 195 08 474 | 9/1996 |
| DE | 195 08 476 | 9/1996 |
| DE | 19629926.0 | 6/1999 |
| EP | 0 704 775 | 7/1995 |

OTHER PUBLICATIONS

Jung et al, "Event–Based Intelligent control of Saturated chemical Plant Using Endomorphic Neural Network Model", Proceedings of the International Symposium on Intelligent Control, Columbus, Aug. 16–18, 1994, pp. 279–284.

Primary Examiner—Leo Picard
Assistant Examiner—Ryan Jarrett
(74) Attorney, Agent, or Firm—Schiff Hardin & Waite

(57) ABSTRACT

The invention relates to an automation system for the erection and operation of industrial plants, in particular for the design, project engineering, implementation, commissioning, maintenance and optimization of individual plant components or complete plants in the basic materials industry, which plants have a computer-based control system which, for a description of the process in control engineering terms, has recourse to process models, for example in he form of mathematical/physical models, neural network models or knowledge-based system, in order to develop the system to the extent that straightforward and cost-effective decentral process management and optimization may be achieved remote from the plant, decentralized process management and optimization by means of one or more interlinked control points is proposed, process changes are continuously monitored online or offline or at least checked by modelling, using modern, public communication means, and the process models, parameters and software are adaptable specifically to the plant.

10 Claims, 4 Drawing Sheets

U.S. PATENT DOCUMENTS 5,521,814 A     5/1996  Teran et al.
5,691,895 A  * 11/1997  Kurtzberg et al. ............ 700/29
5,740,686 A  *  4/1998  Martinetz et al. ............. 72/8.4
5,826,060 A  * 10/1998  Santoline et al. ............. 700/10
6,038,486 A  *  3/2000  Saitoh et al. ................. 700/96
6,085,183 A  *  7/2000  Horn et al. ................... 706/45
6,112,126 A  *  8/2000  Hales et al. .................. 700/29

* cited by examiner

METHOD FOR AUTOMATIC OPERATION OF INDUSTRIAL PLANTS

The invention relates to an automation system for the erection and operation of industrial plants, in particular for the design, project engineering, implementation, commissioning, maintenance and optimization of individual plant components or complete plants in the basic materials industry, having a computer-based control system which, for a description of the process in control engineering terms, has recourse to process models, for example in the form of mathematical/physical models, neural network models or knowledge-based systems.

The increasing requirements on the efficiency of industrial plants, such as rolling mills, require working and production processes which are operated with the highest degree of economy, safety and reliability. It s therefore known to automate production processes consistently to the largest possible extent by means of a computer-aided information flow right from the design stage. Mathematical/ physical process models, which describe the process and hence enable simulation and control of the industrial plants, come in useful, in particular for the process management and optimization.

Control systems used for this purpose are disclosed by DE 195 08 474 A1 or DE 195 08 476 A1. The computer-based control systems automatically detect the state of an industrial plant or, respectively, of a production process running in the plant, and generate instructions that are suitable for the situation and ensure intelligent process management. In addition, continuous process optimization takes place, in that the process model, which is based on desired value predefinitions, is improved offline or online with the aid of adaptive methods, for example neural networks.

Furthermore, the German Paten Application 196 249 26.0, which is not a prior publication, discloses a method for commissioning industrial plants having a plant control system that carries out non-control functions and control functions and whose control functions operate using process models in the form of mathematical models, neural network models or expert systems. The known method is distinguished by the fact that the commissioning is carried out subdivided into commissioning of the non-control functions, with extensive initialization of the control functions by personnel located on site, and extensive commissioning of the control functions by means of remotely transmitted data via data lines from at least one site remote from the plant, preferably from an engineering centre.

Furthermore, U.S. Pat. No. 4,783,998 discloses a method of controlling a generator in which the measured values ascertained on the generator are remotely transmitted to a computer for the purpose of analysis and evaluation. A disadvantage here is that the measured values ascertained relate only to individual components, such as the generator shaft, with the result that statements abcut the overall behaviour of the ganerator cannot be made. By contrast, although the control systems disclosed by DE 195 08 474 A1 and DE 195 08 476 A1, and the method disclosed by the German Patent Application 196 249 26.0 make it possible to optimize the overall process of a complex plant on the basis of model interconnections, this is associated with a high financial outlay. The primary reason for this is that specific transmission paths are necessary in order to be able to perform plant-specific optimization decentrally from a remote site.

SUMMARY OF THE INVENTION

The invention is based on the object of developing an automation system for the erection and the operation of industrial plants to the effect that straightforward and cost-effective decentralized process management and optimization remote from the plant may be achieved whilst avoiding the above described disadvantages.

In the case of an automation system of the type cited at the beginning, the object is achieved according to the invention by decentralized process management and optimization by means of one or more interlinked control points, process changes being continuously monitored online or offline or at least checked by modelling, using modern, public communication means, and the process models, parameters and software being adaptable specifically to the plant.

An automation system which is configured in this way enables cost-effective process management and optimization from a site remote from the plant, in that the data to be remotely transmitted are transmitted to the respective industrial plants by means of existing communication means. Since the data not only relates to process-specific parameters but also take into account changes to the process models or even to the software that is located on site, that is to say at the respective industrial plant, the overall result is a reduction in the engineering costs with a simultaneous improvement in the plant function.

According to a further feature of the invention, remote engineering commissioning is provided, in order, on the one hand, to make use of central computing capacity and modern commissioning tools and, on the other hand, to ensure the feedback of know-how from the respective plant into the development. In order to achieve the highest possible time efficiency, remote online and/or offline optimization is advantageously provided.

Furthermore, it is of particular advantage if provision is made for hardware and software components which are designed such that they can be optimized by means of evolutionary, in particular genetic, algorithms. The use of genetic algorithms offers a high probability of achieving a very good optimum. It is therefore expedient to optimize the process models by means of an evolution strategy, preferably genetic programming. An evolutionary strategy also enables, in particular, the checking of neural networks with respect to values running in the direction of a global optimum. Because of the high computing effort, it is recommended that this should take place off line.

According to an advantageous development of the invention, provision is made for a predefined framework for modular software building blocks. In this way, the exchange of software building blocks without programming work may be achieved, with the result that plant-specific adaptation and the long-term maintenance of the overall automation system are ensured. Furthermore, it is expedient if the communication means are telephone, ISDN, satellite or Internet/Intranet connections, in order to achieve the flexibility with respect to existing data lines that is suitable for the requirement.

According to a further advantageous feature of the invention, the control point is designed as a virtual office. The use of modern communication means in this way achieves, for example, decentralized project engineering, development or after-sales service which ensures the incorporation of global resources on the basis of the interlinking.

According to a development of the invention, the control system can be provided with computer equipment for the adaptation of plant-specific parameters, for the storage of process models of plant-specific design, for the storage of prediction algorithms, for the storage of trend sequences, for the storage of adaptation algorithms, for the training and/or the optimization of neural network models and with diagnostic memories, which can be influenced via communication means. This provides the advantage that an industrial plant can be optimized from a site remote from the plant in accordance with technological predefinitions. For this purpose, it is further proposed that the control point be an engineering centre which is remote from the plant and is connected to the control system of an industrial plant by means of remote data transmission.

According to a preferred development of the invention, the engineering centre has an internal network which, for the purpose of communication with the industrial plants, is connected to a remote commissioning and/or operational optimization network via a security data transmission device. A firewall of this type makes secure work possible and protects against espionage.

In order to achieve the incorporation of external specialist knowledge and different project teams, it is further proposed that the engineering centre be allocated physically separated external sites which are connected to the said centre via data lines.

In a further configuration of the invention, provision is made for an administrator unit which has evaluation software for collected data and is at the same time designed to be suitable for logbook maintenance. In this way, it is possible to follow optimization measures, permitting conclusions to be drawn for future optimization measures. It is expedient if, in the engineering centre, the engineering knowledge is present in databases and in general and plant-specific engineering modules, and can be transmitted to engineering modules and data collection units of the control system, so that the step-by-step improvement of the overall process of an industrial plant is ensured with the straightforward input of new data.

Furthermore, it is expedient if the engineering centre has hardware devices, software tools, commissioning tools, software development tools, software evolution tools, training tools for artificial neural networks and statistical evaluation programs, which can be used in a plant-neutral manner. The use of plant-neutral devices and tools allows the achievement of a universal automation system which uses plant-specific, that is to say specially developed, devices and tools only when this is unavoidable. Finally, it is proposed that the engineering centre be designed as a multi-station project engineering, design, commissioning or operational optimization office by using monitors, computer equipment and cameras, it being possible for immediate dialogue, drawing changes or software input to be supplemented or replaced by remote transmission via speech and video image. External sites of the engineering centre can also be designed in this way. Particularly advantageous effects result in the event of working using artificial neural networks, in which a standardized treatment is required from the collection of the training data right up to the output of new parameters. As a result of the abovementioned configuration of the engineering centre and of the external sites, it is possible to work as though all the people involved in the process management and optimization were at one site, specifically at the site of the industrial plant.

Further details, features and advantages of the subject-matter of the invention emerge from the following description of a preferred exemplary embodiment which is illustrated in the drawings; and

DESCRIPTION OF THE PREFERRED EMBODIMENTS

Figure 1:
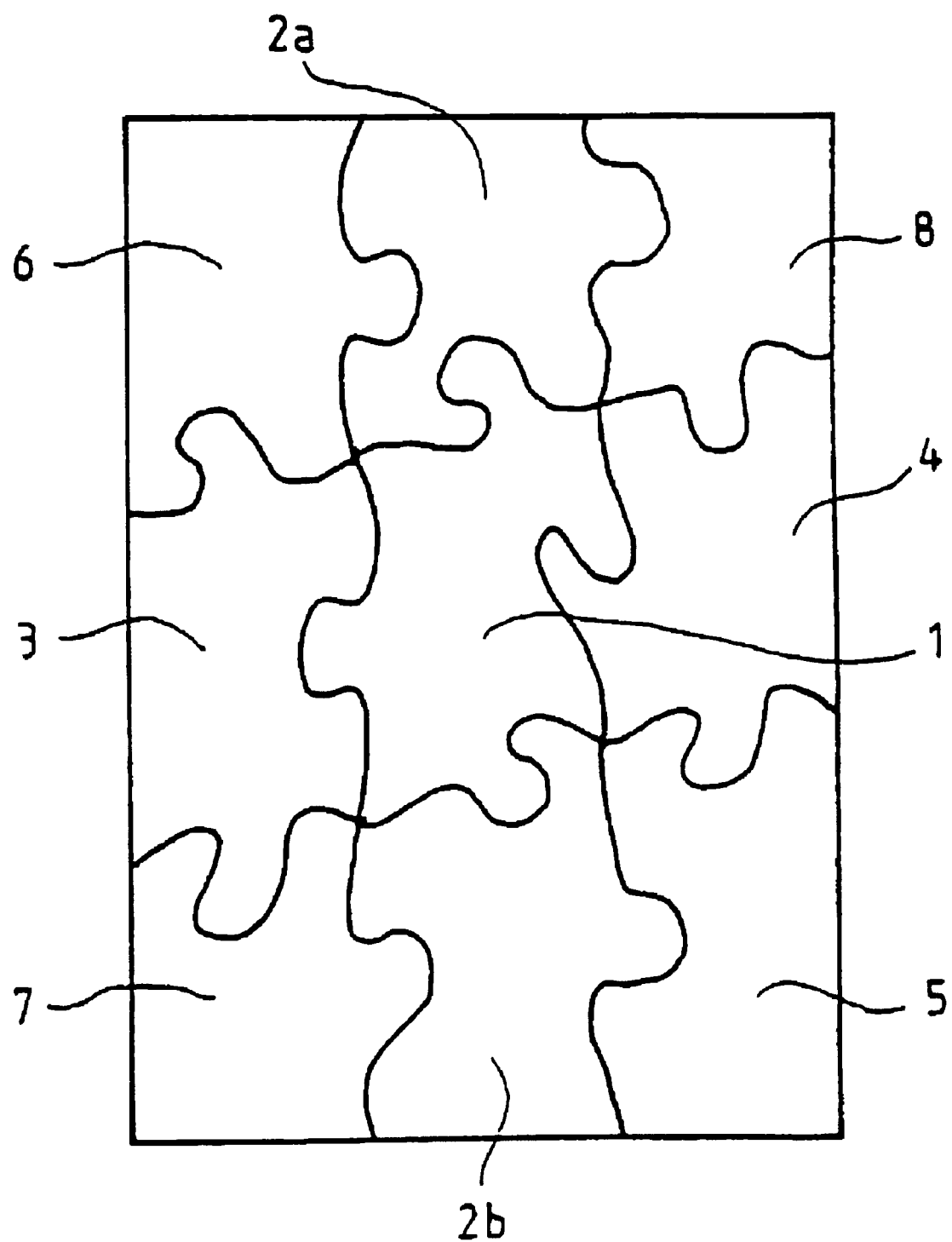
FIG. 1 shows a schematic illustration of the components characterizing the automation system according to the invention.

Located at the centre of the automation system that is illustrated schematically in FIG. 1 are mathematical/physical process models 1 which describe the production process of an industrial plant. With the aid of the mathematical/physical process models 1, it is therefore possible to simulate the plant process and to lay out the plant mechanically and electrically. In order to improve the accuracy of the mathematical/physical process models 1, use is made of neural networks 2a, 2b, which are trained on the basis of a supply of measured values from the industrial plant. The training of the neural networks 2a, 2b can take place off line (2a) or on line (2b), depending on the computing effort. Furthermore, the application of neural networks 2a, 2b can take place in conjunction with the mathematical/physical process models 1 (so-called relative neural network) or can be used for modelling technical processes which have previously eluded a mathematical/physical description (so-called absolute neural network). Neural networks 2b that can be trained on line are particularly useful when it is valid to detect the "state of the day" of an industrial plant, in order to adapt the automation system to this. The training is carried out on the basis of measured values that are registered on line and then flow into an optimization of parameters and/or process models.

Optimal adaptation of the mathematical/physical process model 1 to the respective industrial plant may be achieved by means of genetic algorithms 3. By means of stochastic mutation of various approaches to a solution, it is possible to use these evolutionary algorithms to fend the optimum parameter settings for the plant-specific process models. It is therefore possible to transfer the engineering commissioning from the respective industrial plant into a computing centre remote from the plant, as a result of which the engineering commissioning is automated. A supplement to the above-described parameter optimization by means of genetic algorithms is formed by genetic programming 4. With the aid of this evolution strategy, it is possible to achieve structural improvements to the process models.

The basic precondition for the above-described components is a suitable software architecture. Object-oriented programming 5 in this case ensures the reusability of the software for different applications, in that clear structures and standardized interfaces form the basis for version administration and configuration management. The reusability of user software is additionally enhanced as a result of consistent modularization, in addition to the object orientation. A contribution to the use of standardized software models is also made by so-called frameworks 6, which form a predefined framework for modular software building blocks. In the simplest case, frameworks are to be understood as "software cupboards" into which individual software building locks can be plugged in such d way that the exchange of software building blocks without complicated programming work is possible. The long-term maintenance of the automation system is ensured in this way.

The commissioning of an industrial plant may usually be subdivided into four phases. The first phase comprises erecting the hardware and running up the individual systems. After this, the commissioning of the user software and an interface test take place. The third phase constitutes trying out the industrial plant, which, for example in the case of a rolling mill, may be the rolling of the "first strip". The fourth and last phase is formed by the engineering commissioning, to which the greatest importance is attached within the context of automation. In order to take account of this circumstance, the automation system has recourse to remote commissioning 7 which, via modern communication means, makes engineering commissioning possible from a computing centre remote from the plant. In addition to the provision of a central computing capacity and the support of developers, the feedback of know-how from the industrial plant into the development also takes place in the process. In this way, the long-term care of the industrial plant can be carried out by means of remote diagnosis, which is distinguished by short reaction times.

In order to utilize resources that are available globally, use is made of so-called virtual offices 8 which are linked to one another by means of modern communication means. The virtual offices enable, for example, decentralized project engineering, development or after-sales service.

Figure 2:
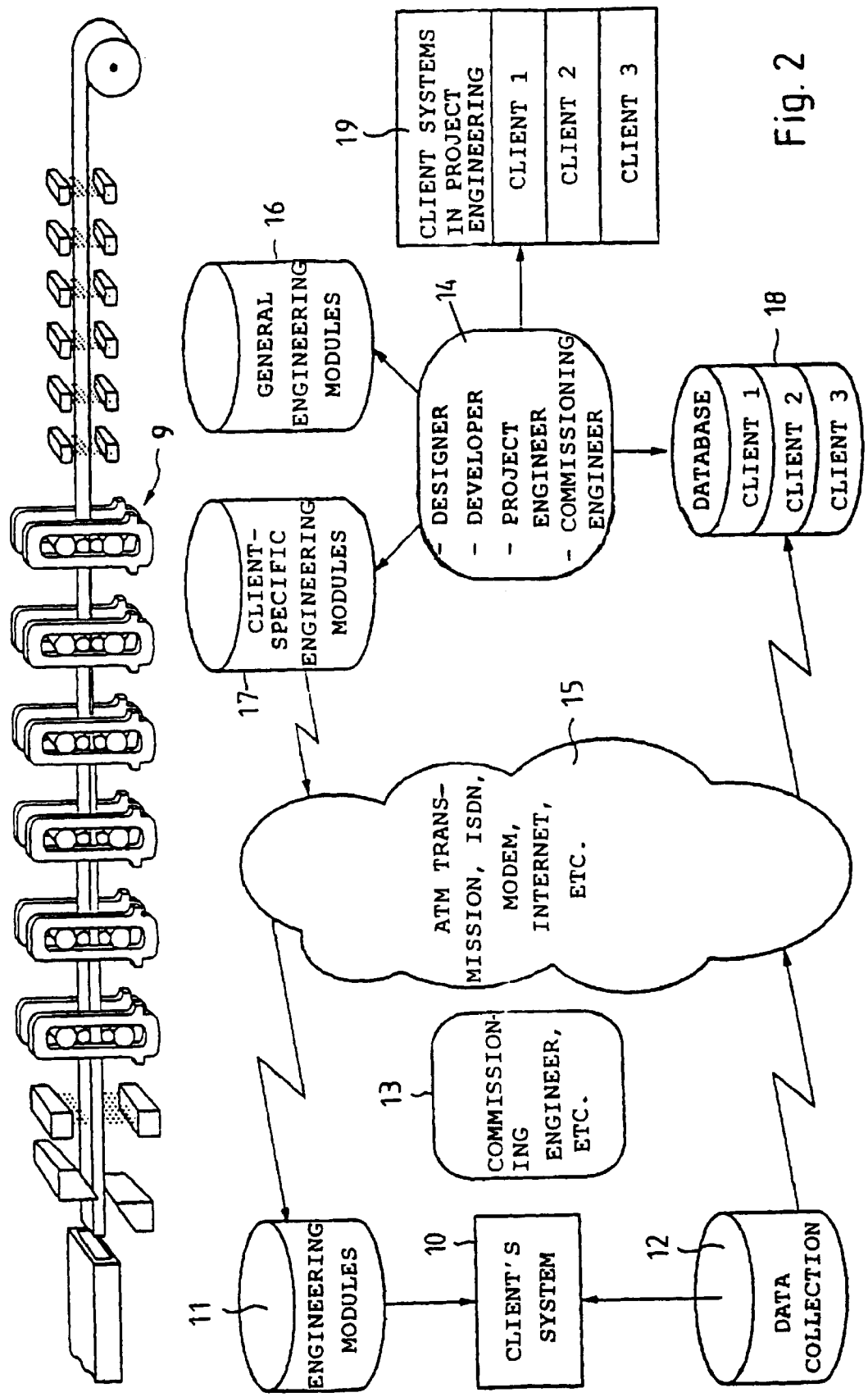
FIG. 2 shows a schematic illustration of the process optimization of an industrial plant.

An automation system having the above-described components 1 to 8 is revealed schematically by FIG. 2. An industrial plant, which is designed as a rolling mill 9, is provided with a control of clients system 10 that comprises engineering modules 11 and a data collection means 12. The first three phases of the commissioning of the rolling mill 9 are carried out by a commissioning engineer 13 located on site. The engineering commissioning taking place in the fourth phase is, on the other hand, carried out by means of an engineering centre 14 which is connected via modern communication means 15 to the control system 10 of the rolling mill 9. The engineering centre 14 contains the process-specific knowledge of designers, developers, project engineers and commissioning engineers. In addition, general and plant-specific engineering modules 16, 17, a database 18 for different industrial plants and a plant-specific system 19 for the project engineering are available to the engineering centre 14. An infrastructure of this type not only enables the remote engineering commissioning, but also permits the after-sales service or maintenance of the rolling mill 9. In this case, the commissioning engineer 13 is a maintenance engineer. If a fault occurs, this engineer is able to achieve a rapid fault diagnosis and rectification by connecting in, in a matter of seconds, the computer capacity that is available in the engineering centre 14 and by including specialists located in the engineering centre 14. As a result of the presence of frameworks 6, it is possible for software modules to be exchanged without the need for one of the specialist teams to travel to the rolling mill 9.

Figure 3:
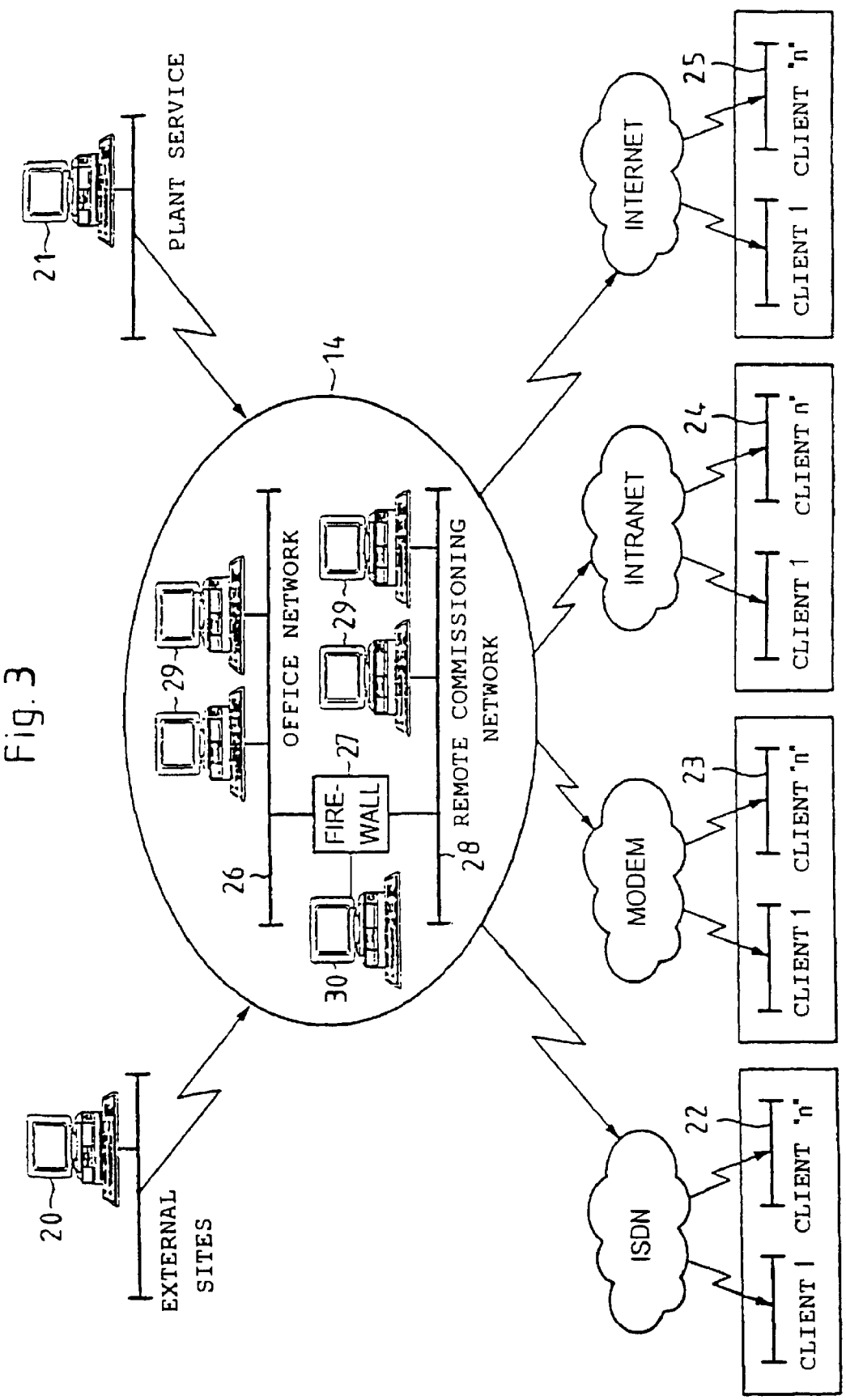
FIG. 3 shows a schematic illustration of an engineering centre.

The structure of the engineering centre 14 is shown in a schematic way in FIG. 3. Assigned to the engineering centre 14 are physically separated external sites 20, which are connected to the engineering centre via data lines. In addition, the engineering centre 14 is connected to service stations 21 which manage regional service areas and evaluate empirical experience. The engineering centre 14 is connected to different industrial plants 22 to 25 via modern communication means 15, such as ISDN, modem, Intranet or Internet. The engineering centre 14 has an internal office network 26 which is connected via a firewall 27 to a remote commissioning network 28. The office network 26 and the remote commissioning network 28 in each case comprise a number of computers 29 which, for example, are connected to one another via an Ethernet having twisted pair connections. The firewall 27 has a monitoring station 30 which prevents unauthorized access from the outside to the internal office network 26.

Figure 4:
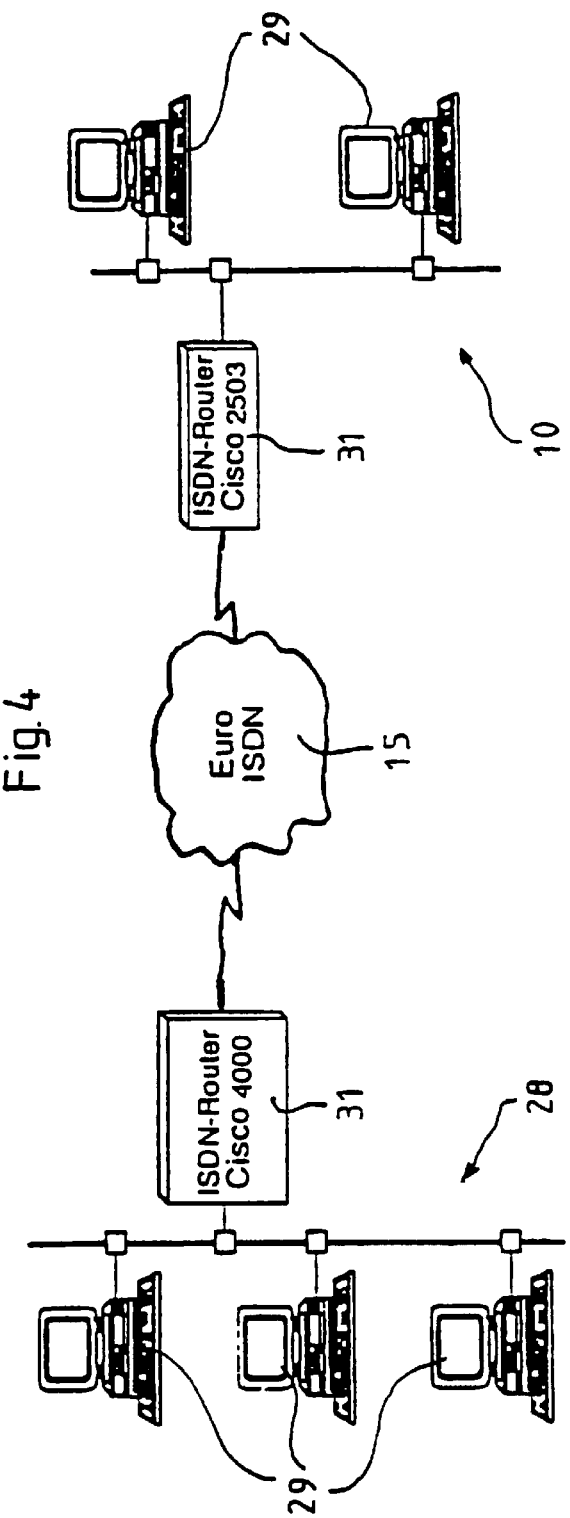
FIG. 4 shows a schematic illustration of the data transmission between the engineering censure and an industrial plant and FIG. 5 shows a schematic illustration of decentralized process management and optimization.

The connection of the remote commissioning network 28 to the control system 10 of an industrial plant via an ISDN data line is shown in FIG. 4. With the aid of so-called routers 31, the optimum connection between the control system 10 and he remote commissioning network 28 is in each case set up automatically, in order for example to enable a dialogue between the commissioning engineer 13 and the engineering centre 14. Connections of this type can be set up regularly or may vary with regard to the day of the week or time of day.

Figure 5:
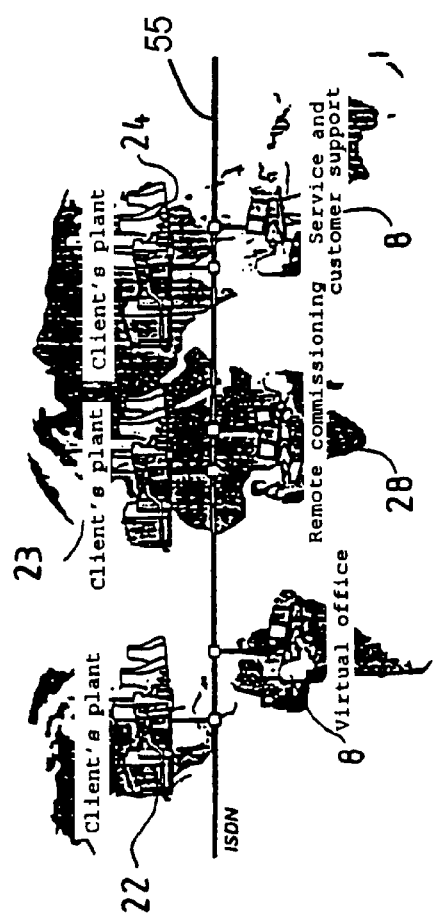

By means of the above-described automation system, the inclusion of world-wide resources is possible, as is also revealed by FIG. 5. The use of modern communication means 55, such as ISDN, provides the preconditions for global, timely and location independent process management and process optimization. A contribution to this is also made, not least, by the setting up of virtual offices 8, which ensure regional plant support, for example with regard to project engineering, development or after-sales service.

We claim:

1. Method for the automatic operation of industrial plants including commissioning, maintenance and optimization of individual plant components or complete plants in the basic materials industry, which operation has a computer-based control system for a description of the process in control engineering terms, has recourse to process models in the form of mathematical/physical models, neural network models, knowledge-based systems and process changes are continuously monitored on-line or off-line or at least checked by modeling and the process models, parameters and software being adaptable specifically to the plant, the improvement comprising providing decentralized process management and optimization by means of one or more control points interlinked with one another via communication means in the form of telephone, ISDN, satellite or Internet/Intranet connections that are fashioned as plant-remote technology center and are in communication with the control system of an industrial plant by remote data transmission, implementing a technological remote commissioning and an on-line and/or off-line remote optimization, and optimizing the process models with an evolution strategy.

2. Method according to claim 1, wherein provision is made for hardware and software components which are optimized by means of evolutionary, genetic, algorithms.

3. Method according to claim 1 including a predefined framework for modular software building blocks.

4. Method according to claim 1, wherein the control system is provided with computer equipment for the adaptation of plant-specific parameters, for the storage of process models of plant-specific design, for the storage of prediction algorithms, for the storage of trend sequences, for the storage of adaptation algorithms, for the training and/or the optimization of neural network models and with diagnostic memories, which are influenced via the communication means.

5. Method according to claim 1, wherein an engineering centre has an internal network which, for the purpose of communication with the industrial plants is connected to a remote commissioning and/or operational optimization network via a security data transmission device.

6. Method according to claim 1, wherein an engineering centre is allocated physically separated external sites which are connected to the said centre via data lines.

7. Method according to claim 1, wherein an administrator unit which has evaluation software for collected data and is at the same time designed to be suitable for logbook maintenance.

8. Method according to one to claim 1, wherein an engineering centre has hardware devices, software tools, commissioning tools, software development tools, software evolution tools, training tools for artificial neural networks and statistical evaluation programs, which are used in a plant-neutral manner.

9. Method according to claim 1, which includes an engineering centre having the engineering knowledge present in database and in general and plant-specific engineering modules, and said database and modules are transmitted to engineering modules and data collection units of the control system.

10. Method according to claim 1, which includes an engineering centre being designed as a multi-station project engineering, design, commissioning and operational optimization office by using monitors, computer equipment and cameras, and including supplementing and replacing immediate dialogues, drawing changes and software inputs by remotely transmitted speech and video images.

* * * * *